United States Patent [19]

Yamano

[11] Patent Number: 4,660,661
[45] Date of Patent: Apr. 28, 1987

[54] COMBINATION WEIGHING MACHINE
[75] Inventor: Shoji Yamano, Akashi, Japan
[73] Assignee: Yamato Scale Company, Japan
[21] Appl. No.: 704,619
[22] Filed: Feb. 22, 1985
[30] Foreign Application Priority Data Feb. 24, 1984 [JP]  Japan ................................. 59-34900

[51] Int. Cl.⁴ ........................................... G01G 19/22
[52] U.S. Cl. .......................................... 177/25; 177/1
[58] Field of Search ...................................... 177/1, 25
[56]  References Cited

U.S. PATENT DOCUMENTS

| 4,336,852 | 6/1982 | Hirano | 177/25 |
| 4,385,671 | 5/1983 | Hirano | 177/25 |
| 4,418,771 | 12/1983 | Henry et al. | 177/1 |
| 4,446,938 | 5/1984 | Kawanishi | 177/25 |
| 4,454,924 | 6/1984 | Minamida | 177/25 |
| 4,470,166 | 9/1984 | Hirano | 177/1 |
| 4,538,693 | 9/1985 | Klopfenstein et al. | 177/25 |

Primary Examiner—George H. Miller, Jr.
Attorney, Agent, or Firm—Senniger, Powers, Leavitt and Roedel

[57] ABSTRACT

A combination weighing machine, comprising a plurality of weighing units each having a weighing hopper, and a plurality of auxiliary hoppers for receiving and holding the contents of corresponding weighing hoppers. Each auxiliary hopper is provided with a memory for storing weight information of its content, and a combination providing a total weight satisfying a predetermined weight condition is selected from the weight information supplied from all the effective weighing units and memories.

8 Claims, 4 Drawing Figures

COMBINATION WEIGHING MACHINE

This invention relates to a combination weighing machine and, especially, to such a machine provided with auxiliary hoppers.

As disclosed, for example, in U.S. Pat. No. 4,336,852, a combination weighing machine is a device including a plurality of weighing units for combining weight signals from the respective weighing units suitably to select a combination having a total weight satisfying a predetermined weight condition. Accuracy of the total weight of the elected combination with respect to the predetermined weight condition increases with an increase in the number of weighing units included in the machine. In a combination weighing machine of so-called "double-shift" type, which is disclosed, for example, in U.S. Pat. Nos. 4,385,671 and 4,370,166, the number of weighing units included in the machine must be more than twice the number of weighing units participating in each elected combination. However, the weighing units, which are precise weighing equipments, are generally expensive and an increase in the number of them will relate directly to increase in the machine price.

For example, U.S. Pat. No. 4,446,938 discloses such a combination weighing machine wherein each weighing unit is provided with an auxiliary hopper and a memory, the product weighed by each weighing unit is transferred to the corresponding auxiliary hopper and, at the same time, the measured weight is stored in the corresponding memory, and the weighing unit is reloaded with new product. Thereafter the machine selects a combination using all the weight signals from the weighing units and corresponding memories. Although this machine exhibited an effect of doubling the number of weighing units, it also has a shortcoming in that it is time-consuming to re-load the auxiliary hopper which has participated in the elected combination. This is especially serious when the corresponding weighing unit has also participated therein, since the auxiliary hopper is unavoidably loaded through the weighing hopper or the weighing unit.

A system which can compensate for this shortcoming is described in the opened Japanese patent specification No. 60-4821 (Application No. 58-112371). In this system, each pair of adjoining weighing units are provided with a common auxiliary hopper so that, when the auxiliary hopper and one of the corresponding pair of weighing units have participated in the elected combination, the unloaded auxiliary hopper is re-loaded from the other weighing unit which has not participated in the elected combination. However, in this system the number of auxiliary hoppers is limited necessarily to one half of the number of weighing units.

An object of this invention is to increase significantly the number of auxiliary hoppers, while conserving the merit of the system of the above Japanese specification.

In accordance with this invention, a combination weighing machine includes a plurality of weighing units each having a weighing hopper, the weighing hoppers being arranged at predetermined intervals. As a feature of this invention, the machine further includes a plurality of auxiliary hoppers disposed respectively between the weighing hoppers, and means associated with each weighing unit for transferring the content of its weighing hopper selectively to either of the auxiliary hoppers at both sides of the weighing hopper.

Now, the structure and operation of the combination weighing machine of this invention will be described in detail below with reference to the accompanying drawings.

Figure 1:
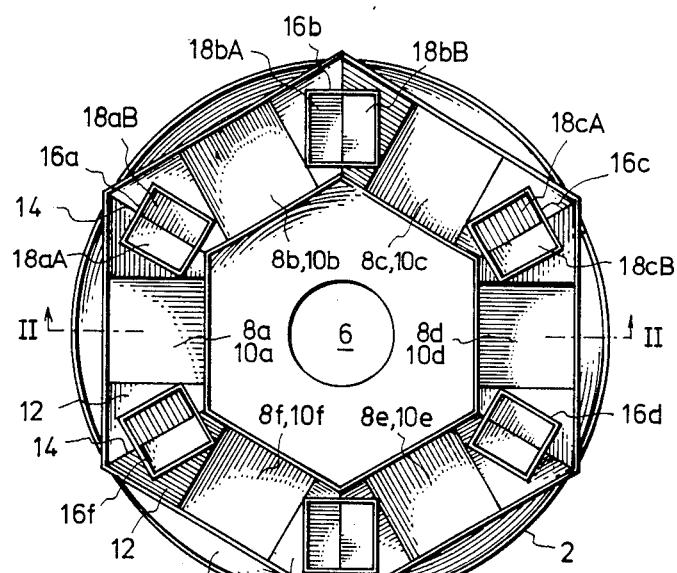
FIG. 1 is a plan view representing an arrangement of essential components of an embodiment of the combination weighing machine according to this invention.
Figure 2:
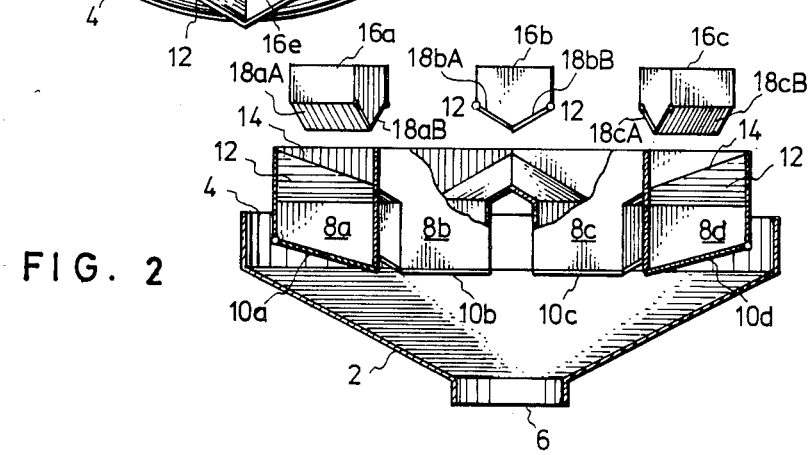
FIG. 2 is a sectional side view taken along line II—II of FIG. 1.

Referring to FIGS. 1 and 2, a circular funnel-like collection chute 2 (constituting a product delivery system) having a large upper opening 4 and a relatively small bottom opening 6 is supported on a suitable machine frame (not shown for simplicity). In the upper opening 4 of the chute 2, there are six auxiliary hoppers 8a, 8b, 8c, 8d, 8e and 8f having flapdoor-type gates (each constituting outlet means for a respective hopper); 10a, 10b, 10c, 10d, 10e and 10f, respectively, at their bottoms and being arranged circularly at equal intervals. Each auxiliary hopper has a pair of flat chutes 12 slanting upwardly from both sides, and adjoining chutes 12 of adjoining auxiliary hoppers are joined at their upper ends to form six ridges 14 at equal angular intervals around chute 2. Just above these ridges 14, there are six weighing hoppers 16a, 16b, 16c, 16e and 16f arranged circularly at equal intervals and supported in place together with the auxiliary hoppers by the same machine frame (not shown). Each weighing hopper has a pair of facing flapdoor-type gates 18A and 18B (which may be referred to as 18aA and 18aB when specified as the gates of weighing hopper 16a, for example,) and the juncture of both gates is in vertical alignment with the ridge 4 thereunder. In other words, it is arranged that, for example, the contents of the weighing hopper 16a will be transferred into auxiliary hopper 8a when the gate 18aA opens, and into auxiliary hopper 8b when the gate 18aB opens. This is also the case for the other weighing hoppers. Thus, each weighing hopper has two auxiliary hoppers associated therewith.

A suitable amount of product is fed to each weighing hopper directly or through a holding hopper. Such a feeding device is disclosed, for exmple, in U.S. Pat. No. 4,344,492 and the opened Japanese patent specification No. 57-160021. However, no further description will be made thereon since it has no direct connection to the subject of this invention.

Figure 3:
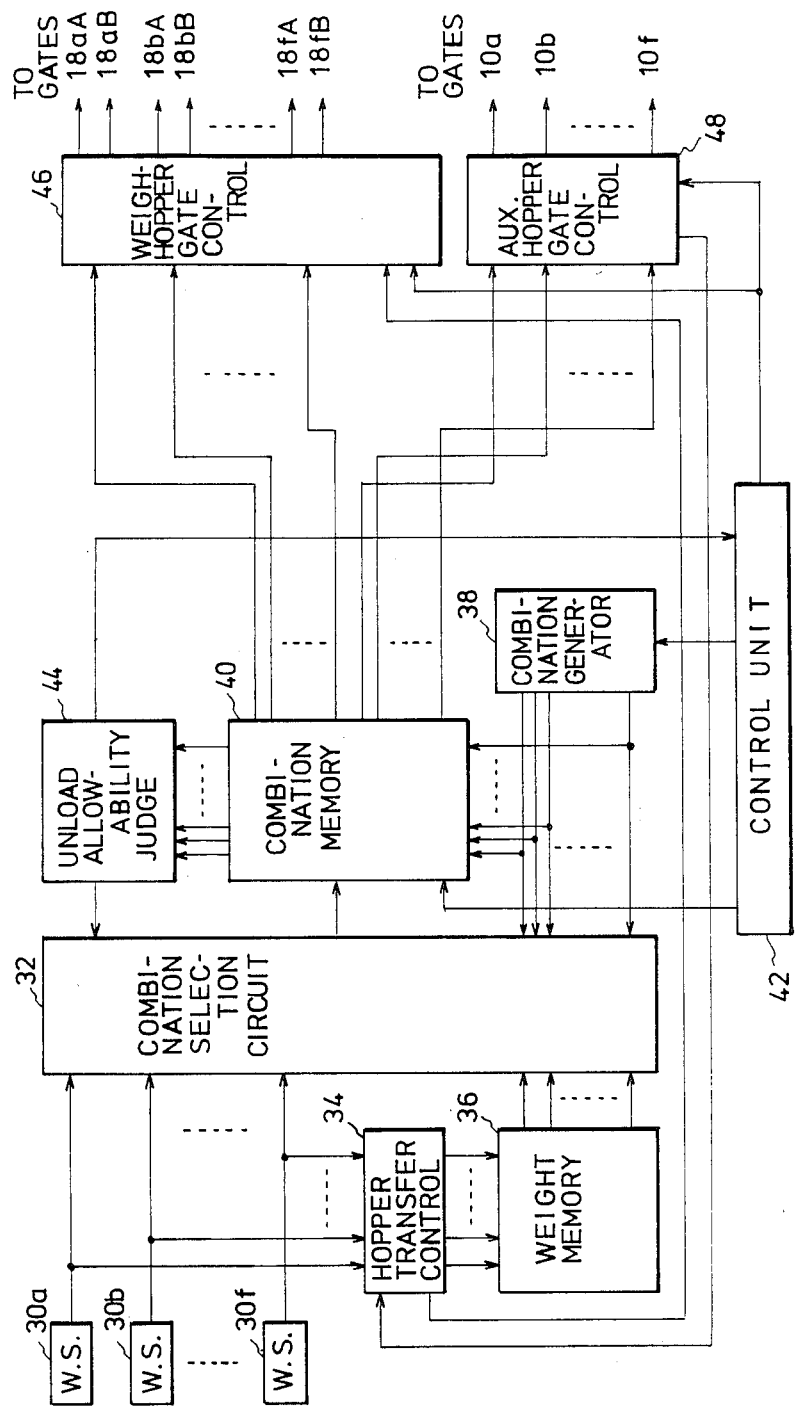
FIG. 3 is a block diagram representing an electric circuit configuration of the embodiment of FIG. 1.

Referring to FIG. 3, weight sensors 30a, 30b, . . . 30f, such as load cells, which are coupled respectively to weighing hoppers 8a, 8b, . . . 8f (FIGS. 1 and 2), have their outputs coupled directly to a combination selection circuit 32 and also coupled through a hopper transfer control circuit 34 to a weight memory 36 whose outputs are also coupled to the combination selection circuit 32. A combination generator 38 may be, for example, a 12-bit binary counter having twelve bit outputs coupled to the combination selection circuit 32 and a combination memory 40. The combination selection circuit 32 serves to sum twelve weight signals in total, which have been received from weight sensors 30a, 30b, . . . 30f and weight memory 36 in accordance with combined outputs from combination generator 38 and, when a resultant sum weight satisfies a predetermined weight condition, to provide an output signal to the combination memory 40 to cause it to store the current output signals of the combination generator 38. In response to a command signal from a control unit 42, the memory 40 transfers its content to a weighing hopper gate control device 46 and an auxiliary hopper gate control device 48. The control devices 46 and 48 respond to timing signals from the control unit 42 to provide gate control signals to the gates corresponding to their input signals to open and unload them. Arrangement and operation of the above combination selection circuit 32, combination generator 38, combination memory 40 and gate control devices 46 and 48 are common to those of conventional combination weighing machines and are described in detail in U.S. Pat. Nos. 4,397,364 and 4,416,341, for example.

The hopper transfer control circuit 34 serves, when some of auxiliary hoppers have been unloaded to become empty, to receive such information from auxiliary hopper gate control device 48 to provide a signal to the weighing hopper gate control device 46 for opening the corresponding gates of the corresponding weighing hoppers to transfer their contents to the empty auxiliary hoppers, and also to provide the output weight signals of these weighing hoppers to corresponding locations of memory 36 to update their contents. Accordingly, whichever auxiliary hopper has been included in the accepted combination and, then, unloaded, it is immediately replenished to restore its initial state.

When a specific weighing hopper is included in an accepted combination, if either of the auxiliary hoppers at respective sides of said weighing hopper is also included in said combination, transfer control circuit 34 will provide a command signal to gate control device 46 for opening the gate of said weighing hopper at the side of said auxiliary hopper. Accordingly, the content of said weighing hopper is discharged with the content of said auxiliary hopper through said auxiliary hopper. However, if neither of the auxiliary hoppers at respective sides of said weighing hopper is included in said combination, this weighing hopper should not be unloaded. An unloading allowability judge unit 44 is provided for ensuring that this weighing unit is not unloaded in this situation. The judge unit 44 reviews the combination written in the memory 40 in response to the output signal from the combination selection circuit 32 and, when the combination includes the abovementioned situation wherein a weighing hopper should not be unloaded, it provides a command signal to the control circuit 42 to cause it to disable gate control devices 46 and 48 and, at the same time, requests the second best combination from combination selection circuit 32. If no problem is detected in this combination, it releases disablement of control devices 46 and 48 to cause them to open the corresponding gates to resume the operation.

Figure 4:
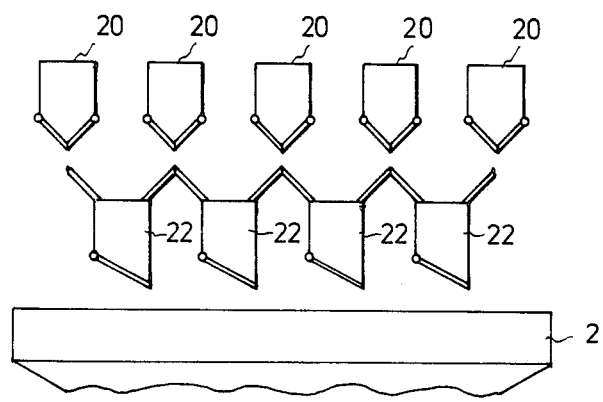
FIG. 4 is a side view representing an arrangement of essential components of another embodiment of the combination weighing machine according to this invention.

Thus, the above embodiment of this invention is provided with auxiliary hoppers of the same number as weighing hoppers and can continuously effect combination weighing operation at high accuracy with the number of used weighing signals being twice the number of weight sensors. It is understood that the number of weighing hoppers (or auxiliary hoppers), namely six, can be changed arbitrarily. While, in the above embodiment, the hoppers are arranged circularly, they may be arranged linearly. FIG. 4 shows the arrangement of weighing hoppers 20 and auxiliary hoppers 22 in this second embodiment. The operation of this embodiment is similar to that of the first embodiment though the number of auxiliary hoppers is less by one than that of weighing hoppers.

While each weighing hopper of the above embodiments is provided with two gates in order to enable transfer of its content to either of the two auxiliary hoppers at its sides, it may be provided with a single gate and a switchable chute to direct the content to either desired side. With such a switchable chute, it becomes possible to discharge the content of the weighing hopper directly into the collection chute 2, thereby omitting the abovementioned judge unit 44.

In the embodiment of FIG. 3, it is impossible to commence the next combination selecting operation, until the unloaded hoppers are completely reloaded and all weight signals become stable. When an auxiliary hopper has been unloaded, it must be replenished from the weighing hopper above it and, thereafter, this weighing hopper must be replenished by the feeding device. However, to await the completion of these steps for commensing the next cycle results in unwanted reduction of working efficiency of the machine. U.S. Pat. Nos. 4,385,671 and 4,470,166 disclose a combination weighing system in which those weighing units included in the accepted combination are inhibited from participating in the next combination selecting operation and the next cycle of operation is executed with the remaining weighing units regardless of stability of the former weighing units. The above problem will be removed by utilizing this system in the device of this invention.

I claim:

1. A combination weighing machine, comprising a plurality of weighing units, each having a weighing hopper attached thereto, arranged at suitable intervals for weighing the contents of said weighing hoppers to produce signals indicative of the weights of product in the hoppers, a plurality of auxiliary hoppers for receiving and holding the weighed contents of said weighing hoppers, means for combining the weight values of product in weighing hoppers and auxiliary hoppers to select a combination weight satisfying a predetermined condition, each auxiliary hopper having outlet means adapted to open for discharging product held in the hopper, and a collection chute for receiving and collecting the contents of said weighing hoppers and auxiliary hoppers;

characterized in that each auxiliary hopper is disposed between a pair of adjacent weighing units and is adapted to receive product discharged from either weighing unit of said pair of adjacent weighing units, and each weighing unit is provided with means for selectively transferring its content into either of said auxiliary hoppers at respective sides of said weighing unit, said weighing machine further comprising control means for effecting unloading of a combination of said weighing hoppers and/or auxiliary hoppers corresponding to said selected combination weight, said control means being operable to effect unloading of a weighing hopper of said combination if at least one of its associated auxiliary hoppers is also included in said combination by causing said outlet means of said one auxiliary hopper to open to discharge the content of the hopper to said collection chute and by causing said weighing hopper to open to discharge its content to said collection chute via the open outlet means of said one auxiliary hopper.

2. The combination weighing machine, according to claim 1, characterized in that said transfer means comprises pair of unloading gates, said gates communicating respectively with said auxiliary hoppers at respective sides and being arranged to open selectively.

3. A combination weighing machine comprising:
a plurality of weighing units and a plurality of holding hoppers, each weighing unit having at least two holding hoppers associated therewith and each holding hopper being associated with at leastl two weighing units;
each weighing unit being adapted for weighing product to arrive at a weight value indicative of the weight of product in the unit and being further adapted to open for discharging product weighed therein into any one of its associated holding hoppers;
each holding hopper being adapted to receive product discharged from any of its associated weighing hoppers;
a memory for storing the weight values of product discharged from respective weighing units into respective holding hoppers;
each holding hopper having outlet means adapted to open for discharging product held in the hopper into a product delivery system;
means for combining the weight values of product in said weighing units and holding hoppers to select a first combination weight satisfying a predetermined condition; and
control means for effecting unloading of a combination of said weighing units and/or holding hoppers corresponding to said selected combination weight, said control means being operable to effect unloading of a weighing unit of said combination if at least one of its associated holding hoppers is also included in said combination by causing said outlet means of said one holding hopper to open to discharge the content of the hopper to said product delivery system and by causing said weighing unit to open to discharge its content to said product delivery system via the open outlet means of said one holding hopper.

4. A combination weighing machine as set forth in claim 3 further comprising means for preventing unloading of a weighing unit of said combination if none of its associated holding hoppers is included in the combination.

5. A combination weighing machine as set forth in claims 3 or 4 further comprising means for selecting an alternative combination weight satisfying said predetermined condition in the event said first combination weight includes a weighing unit but none of its associated holding hoppers.

6. A combination weighing method utilizing a plurality of weighing units and a plurality of holding hoppers, each weighing unit having at least two holding hoppers associated therewith and each holding hopper being associated with at least two weighing units, each weighing unit being adapted for weighing product to arrive at a weight value indicative of the weight of the product and being further adapted to open to discharge product weighed therein into any one of its associated holding hoppers, each holding hopper being adapted to receive product discharged from any of its associated weighing hoppers, a memory for storing the weight values of product discharged from respective weighing units into respective holdings hoppers, each holding hopper having outlet means adapted to open to discharge product held in the hopper to a product delivery system, said method comprising:
combining the weight values of product in said weighing units and said holding hoppers to select a combination of said weighing units and/or holding hoppers holding product having a combined weight satisfying a predetermined condition; and
if said selected combination includes a weighing unit and any one of its associated holding hoppers, effecting unloading of said weighing unit and said one holding hopper by opening said outlet means of said one hopper to discharge its content to said product delivery system and by opening said weighing unit to discharge its content to said product delivery system via the open outlet means of said one holding hopper.

7. A method as set forth in claim 6 further comprising preventing unloading of a weighing unit of said combination if none of its associated holding hoppers is included in the combination.

8. A method as set forth in claim 7 further comprising selecting an alternative combination weight satisfying said predetermined condition in the event said first combination weight includes a weighing unit but none of its associated holding hoppers.

* * * * *

UNITED STATES PATENT AND TRADEMARK OFFICE
CERTIFICATE OF CORRECTION

PATENT NO. : 4,660,661

DATED : April 28, 1987

INVENTOR(S) : Shoji Yamano

It is certified that error appears in the above-identified patent and that said Letters Patent is hereby corrected as shown below:

Column 1, line 18, "4,370,166" should read -- 4,470,166 --.

Column 1, line 22, "equipments" should read -- equipment --.

Column 5, line 12, Claim 3, "least1" should read -- least --.

Signed and Sealed this

Twenty-second Day of November, 1988

Attest:

DONALD J. QUIGG

*Attesting Officer*  *Commissioner of Patents and Trademarks*